(12) United States Patent
Trexler et al.

(10) Patent No.: US 11,378,475 B2
(45) Date of Patent: Jul. 5, 2022

(54) SYSTEM AND METHOD FOR EVALUATION OF HELMET PERFORMANCE

(71) Applicant: The Johns Hopkins University, Baltimore, MD (US)

(72) Inventors: Morgana M. Trexler, Baltimore, MD (US); Vanessa D. Alphonse, Silver Spring, MD (US); Matthew G. Bevan, Silver Spring, MD (US); Catherine M. Carneal, Silver Spring, MD (US); Quang T. Luong, Highland, MD (US); Mark A. Athey, Eldersburg, MD (US); Kathleen M. Perrino, Baltimore, MD (US); Andrew C. Merkle, Darnestown, MD (US); Jeffrey M. Paulson, Catonsville, MD (US); Steven M. Storck, Timonium, MD (US)

(73) Assignee: The Johns Hopkins University, Baltimore, MD (US)

( * ) Notice: Subject to any disclaimer, the term of this patent is extended or adjusted under 35 U.S.C. 154(b) by 148 days.

(21) Appl. No.: 16/966,544

(22) PCT Filed: Jan. 8, 2019

(86) PCT No.: PCT/US2019/012641
§ 371 (c)(1),
(2) Date: Jul. 31, 2020

(87) PCT Pub. No.: WO2019/172990
PCT Pub. Date: Sep. 12, 2019

(65) Prior Publication Data
US 2021/0048359 A1 Feb. 18, 2021

Related U.S. Application Data

(60) Provisional application No. 62/640,292, filed on Mar. 8, 2018.

(51) Int. Cl.
*G01L 5/00* (2006.01)
*G01M 7/08* (2006.01)
(Continued)

(52) U.S. Cl.
CPC ............. *G01L 5/0052* (2013.01); *G01M 7/08* (2013.01); *G01N 3/066* (2013.01); *G01N 3/30* (2013.01);
(Continued)

(58) Field of Classification Search
CPC ....... G01L 5/0052; G01M 7/08; G01N 3/066; G01N 3/30; G01N 2203/0067; G01N 2203/0094; G09B 23/34
See application file for complete search history.

(56) References Cited

U.S. PATENT DOCUMENTS 3,331,236 A 7/1967 Payne et al.
6,871,525 B2 3/2005 Withnall et al.
(Continued)

OTHER PUBLICATIONS

International Search Report and Written Opinion of the International Search Authority, dated Jul. 24, 2019.
(Continued)

*Primary Examiner* — Max H Noori
(74) *Attorney, Agent, or Firm* — Todd Farnsworth

(57) ABSTRACT

A system provided herein may be configured to evaluate helmet performance. The system may include an impact assembly that includes a stationary post operably coupled to one or more stationary load cells and a plurality of modular headforms. Each modular headform may include a first side and a second side configured to lock together around the impact assembly and receive a helmet. The modular headform may determine a position of the helmet relative to the one or more stationary load cells. Furthermore, the one or more stationary load cells may be configured to measure
(Continued)

impact force at a position where one of the plurality of the modular headforms are operably coupled to the impact assembly. Additionally, each of the plurality of modular headforms correspond to a position in relation to the impact assembly to measure the impact force to the one or more load cells at a predefined number of impact locations on the helmet to evaluate the performance of the helmet.

18 Claims, 12 Drawing Sheets

(51) Int. Cl.
    *G01N 3/06* (2006.01)
    *G01N 3/30* (2006.01)
    *G09B 23/34* (2006.01)

(52) U.S. Cl.
    CPC ..... *G09B 23/34* (2013.01); *G01N 2203/0067* (2013.01); *G01N 2203/0094* (2013.01)

(56) References Cited

U.S. PATENT DOCUMENTS

| | | | |
|---|---|---|---|
| 7,204,165 B1 | 4/2007 | Plaga et al. | |
| 8,700,354 B1 | 4/2014 | Bentley et al. | |
| 9,713,756 B1* | 7/2017 | Tran | G06Q 40/08 |
| 2008/0256685 A1 | 10/2008 | Lampe et al. | |
| 2010/0229663 A1 | 9/2010 | Wang et al. | |
| 2011/0035162 A1 | 2/2011 | Matischweiger | |
| 2011/0218756 A1* | 9/2011 | Callsen | G16Z 99/00 |
| | | | 702/139 |
| 2013/0110415 A1* | 5/2013 | Davis | A61B 5/6803 |
| | | | 702/41 |
| 2014/0045161 A1 | 2/2014 | Nguyen | |
| 2015/0369694 A1 | 12/2015 | Neale et al. | |
| 2016/0018278 A1* | 1/2016 | Jeter, II | G01L 5/0052 |
| | | | 340/665 |
| 2017/0196293 A1* | 7/2017 | Podboy | A42B 3/283 |
| 2017/0261416 A1 | 9/2017 | Wu et al. | |
| 2020/0000166 A1* | 1/2020 | Hui | G01S 19/25 |
| 2021/0045486 A1* | 2/2021 | Park | G06F 1/163 |
| 2021/0280088 A1* | 9/2021 | Sedberry | G01D 21/02 |

OTHER PUBLICATIONS

Review of Department of Defense Test Protocols for Combat. Helmets; Committee on Review of Test Protocols Used by the DoD to Test Combat Helmets; Board on Army Science and Technology; Division on Engineering and Physical Sciences; National Research Council; National Academies Press, Washington, D.C.; 2014; relevant sections include chapters 3, 4, 10, and appendix D.

Anctil et al., A Novel Test Methodology to Assess the Performance of Ballistic Helmets, 22nd International Symposium on Ballistics, Vancouver, BC, Canada, Nov. 14-18, 2005, pp. 1311-1318.

* cited by examiner

SYSTEM AND METHOD FOR EVALUATION OF HELMET PERFORMANCE

This application claims the benefit of U.S. Provisional Application No. 62/640,292 filed on Mar. 8, 2018, the entire contents of which are hereby incorporated herein by reference.

STATEMENT OF GOVERNMENTAL INTEREST

This invention was made with U.S. Government support under contract number W911QY-15-C-0039 awarded by the U.S. Army. The government has certain rights in the invention.

TECHNICAL FIELD

Exemplary embodiments of the present disclosure generally relate to evaluating helmet performance.

BACKGROUND

Behind Helmet Blunt Trauma (BHBT) is an injury to an individual's head, resulting from backface deflection or deformation of a helmet in response to receiving an impact (e.g., a ballistic impact). In this regard, the helmet may successfully stop the threat or projectile that caused the impact. However, due to design constraints of a helmet, such as keeping the helmet light-weight, there is often limited standoff between the helmet and the individual's head. Accordingly, in response to backface deformation or deflection of the helmet (i.e., deformation or deflection toward the individual's head) as a result of stopping the threat or projectile, the helmet may cause injury or trauma to an individual's head wearing the helmet. BHBT may lead to a range of injuries including skull fracture, brain contusion, hematomas, and axonal injuries. However, while BHBT is a concept known in the art, head motion, bone strain/deformation, and interior brain strain and/or pressure as a result of the impact on the helmet are not well understood.

Methodologies currently known in the art used to measure and test penetration resistance and backface deformation and deflection of helmets are not well controlled and may require careful conditioning and calibration prior to evaluating the helmet, which increases user testing time and potential for variable implementation and results. Furthermore, deformations and deflections created by helmets when impacted by severe threats may be so great that they cannot be accurately captured by available methods, and current methods implement a pass/fail threshold rather than a graded injury response rating. Accordingly, methods known in the art prevent reliable and meaningful measurements of forces related to backface deformation and deflection of a helmet.

BRIEF SUMMARY OF SOME EXAMPLES

Some example embodiments provided herein relate to a system and method for evaluation of a helmet's performance. In this regard, the system may be configured to characterize behind helmet impact mechanics for various helmet and projectile types in a repeatable, reproducible, and low-cost manner, with a quantifiable metric that may be linkable to injury risk. In this respect, the system may be configured to evaluate a plurality of helmets at a plurality of impact locations in order to determine the performance of the helmet in response to an impact from a projectile or threat.

Accordingly, in one example embodiment, a system is provided. The system may be configured to evaluate helmet performance. The system may include an impact assembly that includes a stationary post operably coupled to one or more stationary load cells and a plurality of modular headforms. Each modular headform may include a first side and a second side configured to lock together around the impact assembly and receive a helmet.

The modular headform may determine a position of the helmet relative to the one or more stationary load cells. Furthermore, the one or more stationary load cells may be configured to measure impact force at a position where one of the plurality of the modular headforms are operably coupled to the impact assembly. Additionally, each of the plurality of modular headforms correspond to a position in relation to the impact assembly to measure the impact force to the one or more load cells at a predefined number of impact locations on the helmet to evaluate the performance of the helmet.

In another example embodiment, a method for evaluating a helmet is provided. The method may include coupling a modular headform assembly to an impact assembly in a first configuration, where the impact assembly is stationary and configured to measure an impact force to the modular headform assembly at a position where the modular headform assembly is coupled to the impact assembly. The method may further include attaching a helmet to the modular headform assembly and measuring the impact force to the modular headform assembly, via the impact assembly, at the first configuration. The method may even further include disassembling the modular headform assembly from the first configuration and reassembling the modular headform assembly to the impact assembly in a second configuration. The method may also include measuring the impact force to the modular headform assembly, via the impact assembly, at the second configuration.

BRIEF DESCRIPTION OF THE SEVERAL VIEWS OF THE DRAWING(S)

Having thus described some embodiments of the present invention in general terms, reference will now be made to the accompanying drawings, which are not necessarily drawn to scale, and wherein:

DETAILED DESCRIPTION

Figure 1:
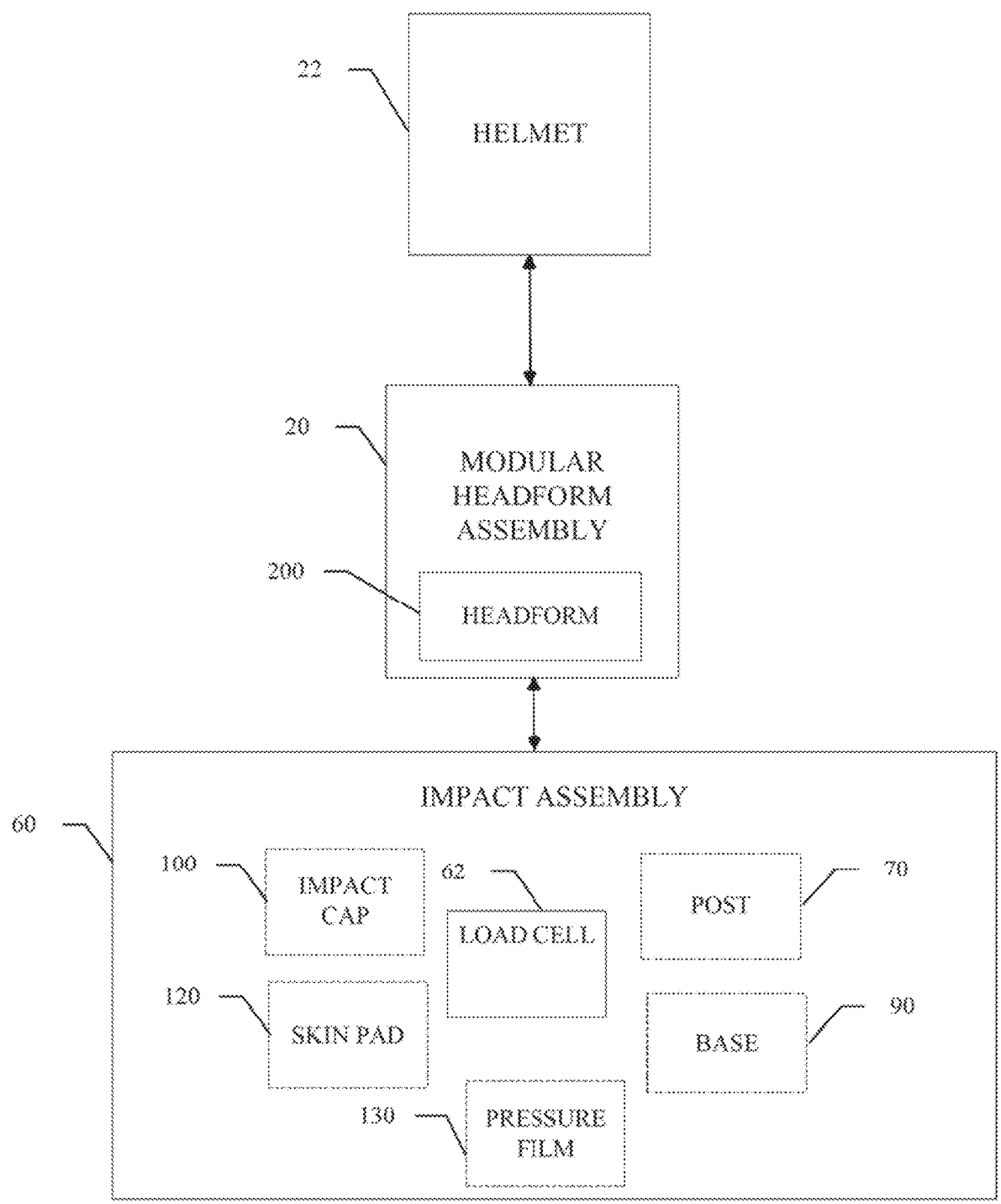
FIG. 1 illustrates a block diagram of a helmet performance evaluation system according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the phrase "operable coupling" and variants thereof should be understood to relate to direct or indirect connection that, in either case, enables functional interconnection of components that are operably coupled to each other.

Some example embodiments may provide for evaluation of a helmet's performance. In this regard, a system described herein may be configured to test an impact force to a helmet caused by a projectile or threat at multiple impact locations. The measurement of the impact force at each impact location may aid in characterizing behind helmet impact mechanics in a quantifiable metric that may be linkable to injury risk.

The system may accommodate different impact locations and different helmet types, sizes, styles, or designs via incorporation of a modular headform assembly and produce repeatable, dynamic impact force measurements via an impact assembly. Importantly, the impact assembly is a stationary assembly, and there is no need to reposition the impact assembly to test the impact force to the helmet at different impact locations, which results in tests that can be quickly and easily repeatable at each different impact location that the user desires to test. In this regard, rather than moving the impact assembly or the direction of the incoming projectile or threat between each test, the modular headform assembly is configured to change around the impact assembly based on the impact location being tested. Thus, the system enables repeatable and reproducible measurement testing of an impact force at each impact site being tested on the helmet, with the modularity of the system enabling quick test turnaround and efficient switching between impact sites and helmets. Furthermore, the system enables the quantification of the area of damage caused by the projectile or threat and the load magnitude as well as temporal and spatial distribution of the load at the location the projectile or threat struck the helmet. The quantification of the load magnitude as well as temporal and spatial distribution of the load by the system described herein provides information about helmet performance and any design constraints that may exist for the helmet in relation to protection from BHBT.

Figure 2:
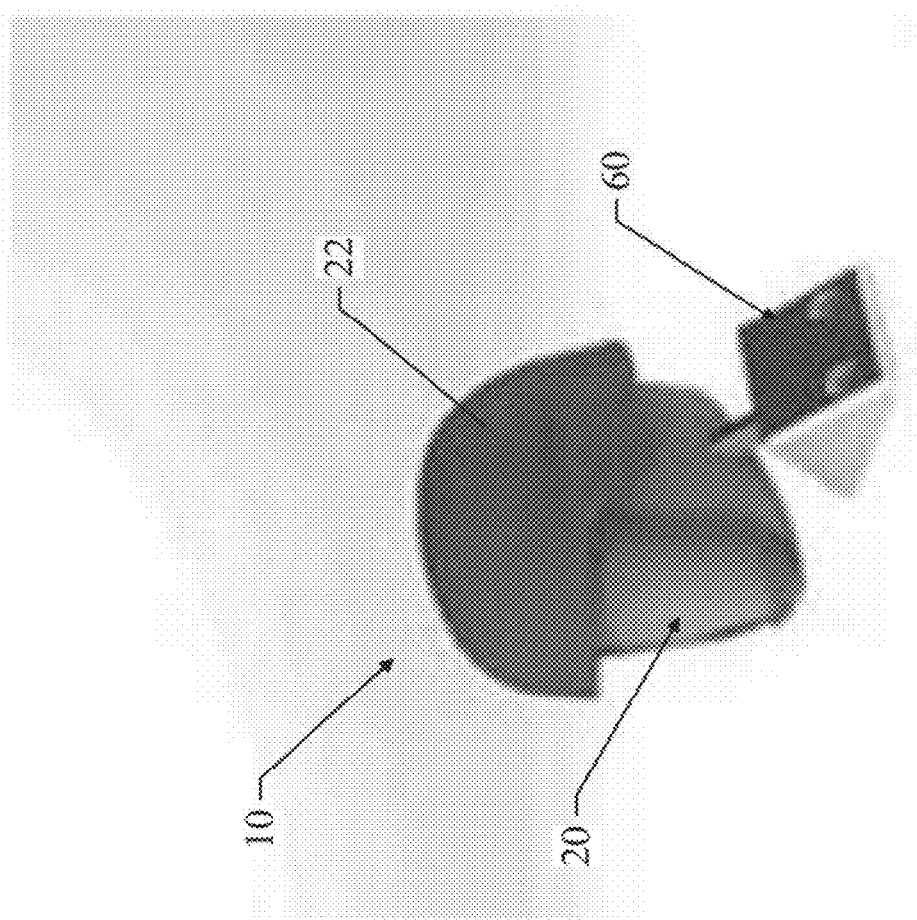
FIG. 2 illustrates a helmet performance evaluation system according to an example embodiment.
Figure 3:
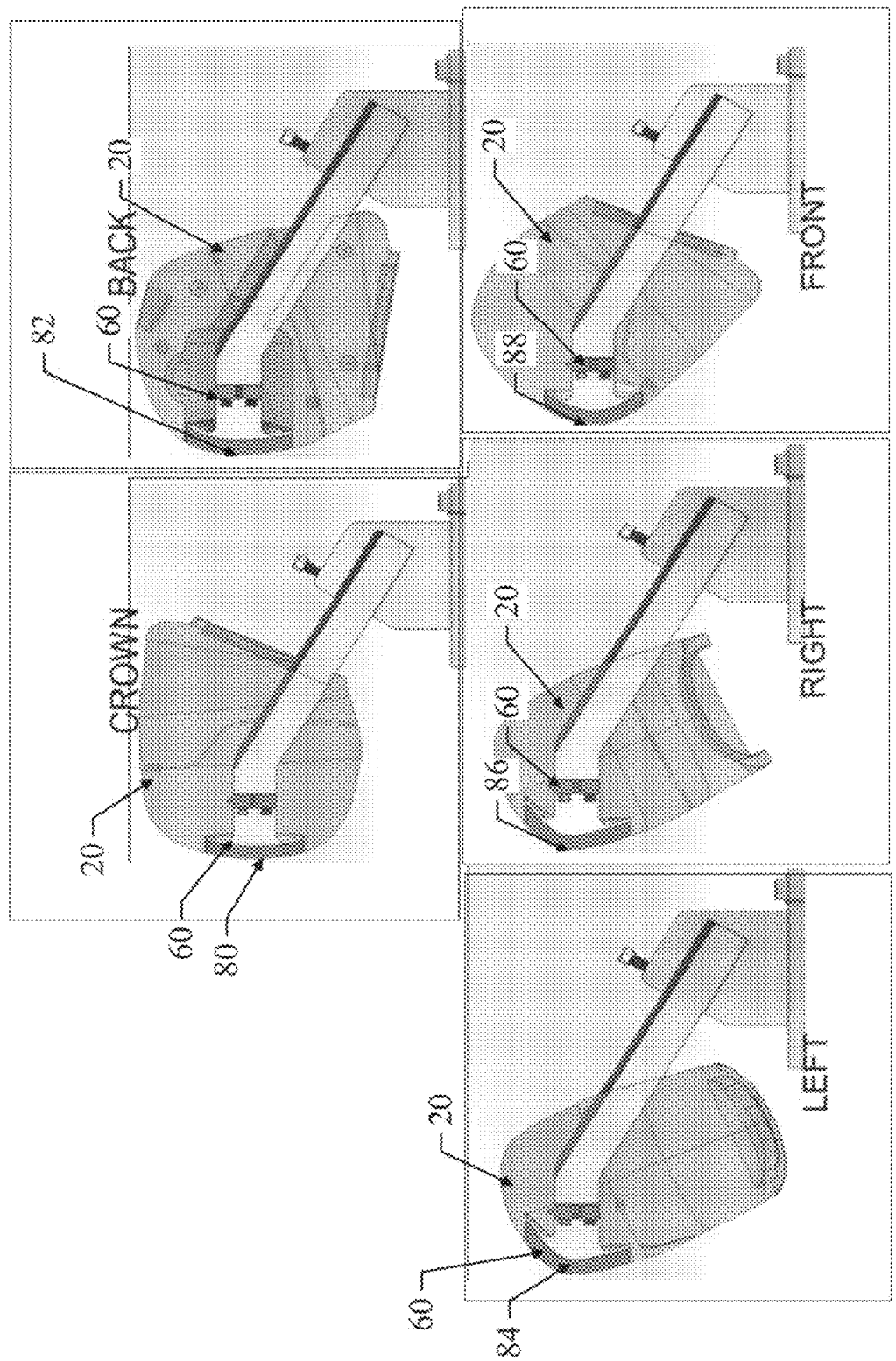
FIG. 3 illustrates a helmet performance evaluation system in a plurality of positions according to an example embodiment.

FIGS. 1-3 illustrate a helmet performance evaluation system ("system") 10 according to an example embodiment. As shown in FIGS. 1 and 2, the system 10 may include a modular headform assembly 20 that is configured to receive a helmet 22 for evaluation, and an impact assembly 60 that is configured to measure an impact force to the helmet 22. The modular headform assembly 20 may be configured to be operably coupled to the impact assembly 60 for evaluation of the helmet 22.

As shown in FIG. 3, the impact assembly 60 may be configured to measure the impact force to the modular headform assembly 20 at a position (see e.g., any of positions 80, 82, 84, 86, or 88) where the modular headform assembly 20 is operably coupled to the impact assembly 60. In this regard, the modular headform assembly 20 may be operably coupled to the impact assembly 60 in a first position (any of positions 80, 82, 84, 86, or 88) to test the impact force to the helmet 22 at that position and then disassembled and reassembled around the stationary impact assembly 60 at any of the remaining positions (80, 82, 84, 86, or 88) to test the impact force to the helmet 22 at that position. This disassembling and repositioning of the modular headform assembly 20 may be repeated until all desired impact locations or positions are tested. In this regard, the helmet 22 may be evaluated by firing a projectile or threat (e.g., 9×19 NATO round at muzzle velocity, rifle rounds, or the like) from a stationary firing position at the position (80, 82, 84, 86, or 88) where the modular headform assembly 20 is operably coupled to the impact assembly 60 in order to measure the impact force or load magnitude from the projectile or threat at that position (80, 82, 84, 86, or 88). This impact force or load magnitude measured may then be correlated to the helmet performance and how it relates to protecting an individual's head from BHBT. Furthermore, as is shown in FIG. 3 and as mentioned above, the modular headform assembly 20 may be moved to a plurality of positions (any of positions 80, 82, 84, 86, or 88) in relation to the stationary impact assembly 60 to measure the performance of the helmet 22 at each of the respective positions (80, 82, 84, 86, or 88).

Figure 4:
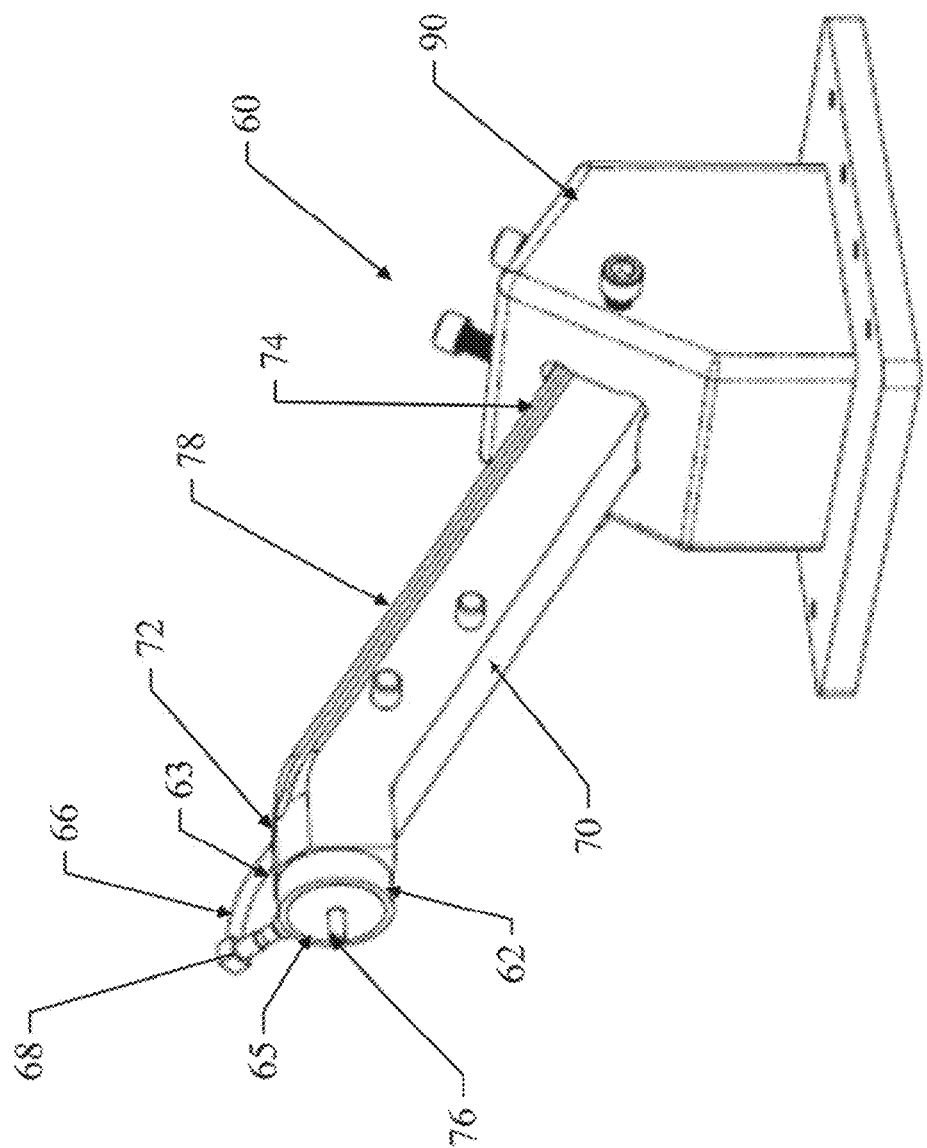
FIG. 4 illustrates a perspective view of an impact assembly according to an example embodiment.
Figure 5:
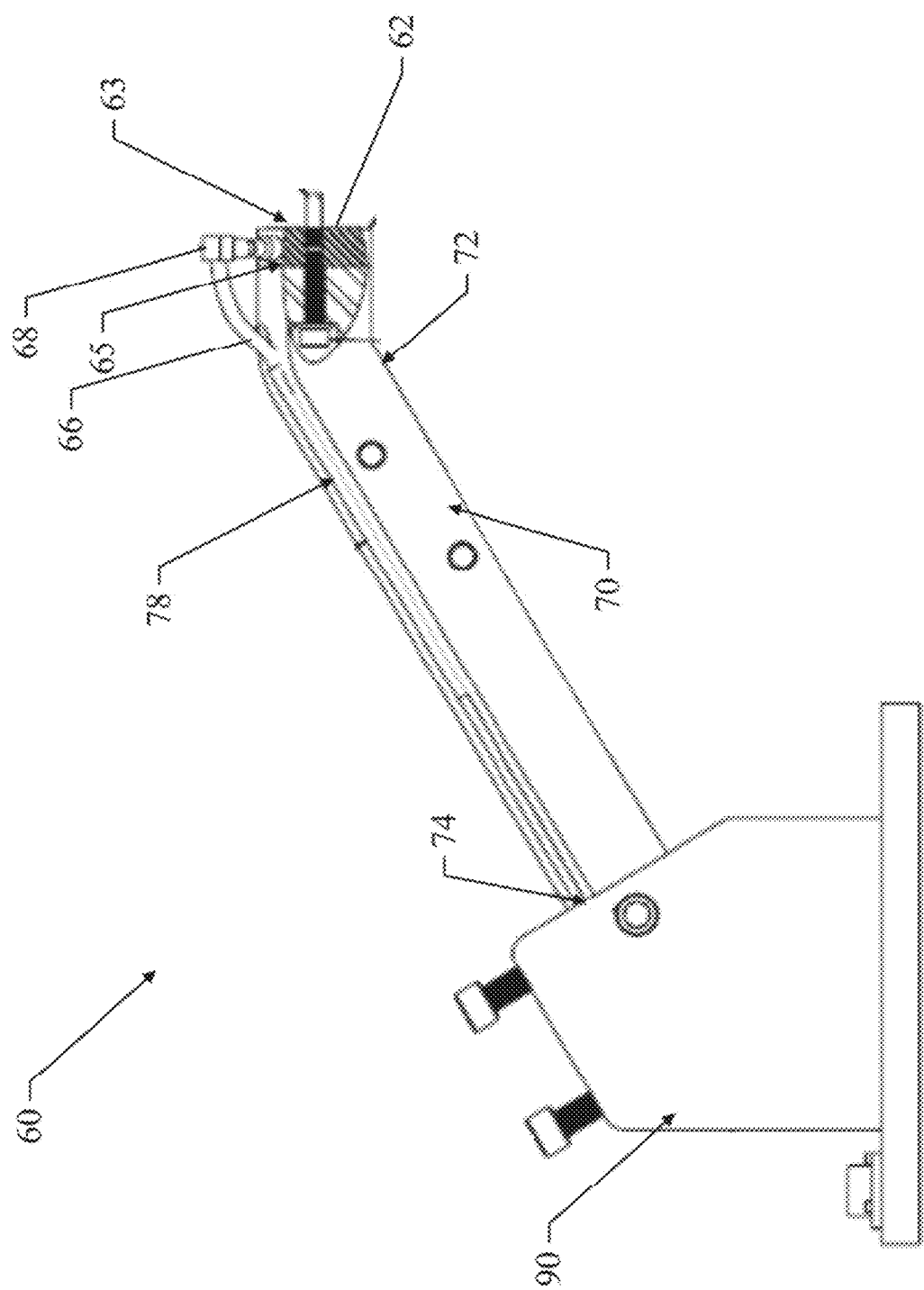
FIG. 5 illustrates a side view of an impact assembly according to an example embodiment.

FIGS. 4 and 5 illustrate the impact assembly 60 according to example embodiments herein. As shown in FIGS. 4 and 5, the impact assembly 60 may include a load cell 62. The load cell 62 may be configured to measure the impact force or load to the helmet 22 at the position (any of positions 80, 82, 84, 86, or 88 as shown in FIG. 3) where the load cell 62 is operably coupled to the modular headform assembly 20. In this regard, the load cell 62 may be a sensor configured to measure the force or load caused by the impact of the projectile or threat to the helmet 22. In other words, the load cell 62 may measure the load at a specific impact location or position. The impact location or position may be a location where the impact assembly 60 is operably coupled to the modular headform assembly 20. Commercial examples of possible load cells 62 include a PCB Piezotronics Model 200C20, PCB Piezotronics Model 203B, PCB Piezotronics Model 224C, or Kistler Type 9137b.

The load cell 62 may have a predetermined diameter. This diameter may be based on the specific threat or helmet position being tested by the system 10. For example, in some example embodiments, it may be desirable to measure the force of the impact to the helmet 22 over a smaller area to impart insight into how forces are localized on the helmet 22 and what magnitude of stress is incurred at the center of impact. When a smaller area of the helmet 22 is desired to be test, a smaller diameter load cell 62 (e.g., about 1.5 inch diameter) may be used. However, in cases, where the entire area of impact to the helmet 22 caused by the projectile or threat is desired to be tested, a large diameter load cell 62 (e.g., about 3.5 inch diameter) may be used. In this regard, a single load cell 62 of some example embodiments may have a diameter of about 1.0 inch to 4.0 inch. Accordingly, the single load cell 62 may have a diameter of at least about 1.0, 1.25, 1.5, 1.75, 2.0, 2.25, or 2.5 inches or at most about 2.75, 3.0, 3.25, 3.5, 3.75, or 4.0 (e.g., about 1.25-4.0 inches, about 1.5-3.5 inches, etc.).

Furthermore, in order to capture the impact force of the projectile or threat, the load cell 62 of some example embodiments may be configured to measure a load of about 1,000-50,000 pounds of force (lbf). In this regard, the load of a single load cell 62 may be configured to measure a load of at least about 1,000, 5,000, 10,000, 15.000, 20,000, or 25,000 lbf or at most about 25,000, 30,000, 35,000, 40,000, 45,000, or 50,000 lbf (e.g., about 10,000-40,000 lbf, about 10,000-25,000 lbf, etc.). Additionally, the load cell 62 of some example embodiments herein may have a predefined thickness of about 0.1-2.0 inches. In this regard, the thickness of a single load cell 62 may be at least about 0.1, 0.2, 0.3, 0.4, 0.5, 0.6, 0.7, 0.8, 0.9, or 1.0 inches and at most about 1.2, 1.4, 1.6, 1.8, or 2.0 inches (e.g., about 0.4-1.6 inches, about 0.5-1.2 inches, etc.)

Figure 6:
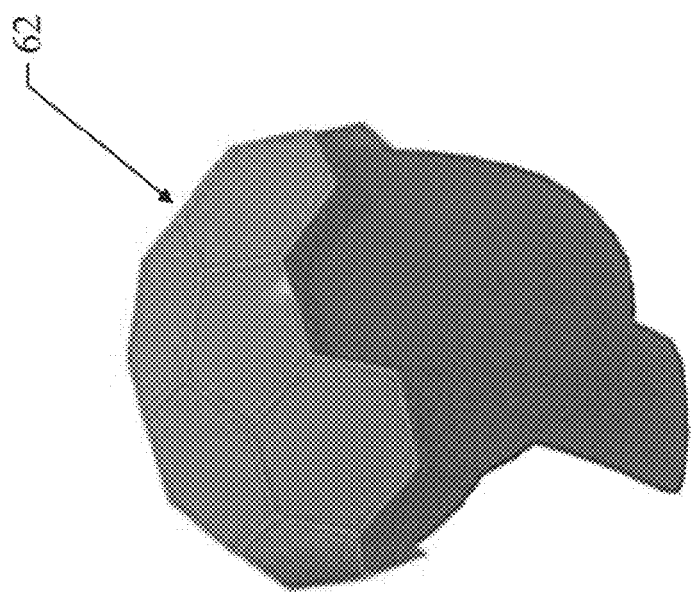
FIG. 6 illustrates a load cell array according to an example embodiment.
Figure 7:
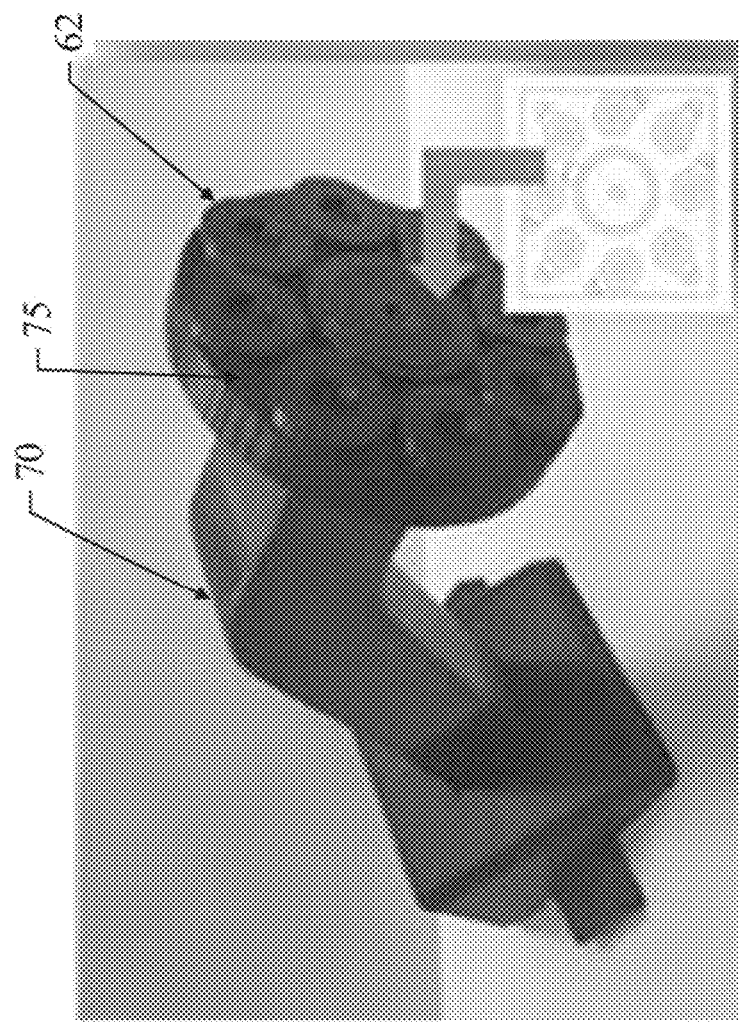
FIG. 7 illustrates a load cell according to a further example embodiment.

In some example embodiments, where more than a single load or impact history at a specific impact location is desired as measured by a single load cell 62, the load cell 62 used in the impact assembly 60 may be a load cell array. Accordingly, it should be understood that the load cell 62 may be a single load cell or an array of load cells. FIGS. 6 and 7 illustrate example embodiments of when the load cell 62 is a load cell array. As shown in FIGS. 6 and 7, the load cell array may be configured to cover a larger diameter than a single load cell can cover or approximately an interior surface of the modular headform assembly 20. The load cell array may be configured to more easily quantify where the impact of the projectile or threat occurred and provide data related to the spatial and temporal distribution of load via the differential response of each load cell 62 in the load cell array. When the load cell array covers the entire interior surface of the modular headform assembly 20, load measurements may be taken around the entire modular headform assembly 20 regardless of the specific position where the modular headform assembly 20 is operably coupled to the impact assembly 60. In this respect, each of the load cells 62 in the load cell array may be configured to measure a certain load and have a predefined diameter based on the threat or impact area being tested. For example, the load cell 62 placed directly in line with where the projectile is being fired (i.e., the load cell 62 directly aligned with where the modular headform assembly 20 is operably coupled to the impact assembly 60) may have a larger load capacity (e.g., 10,000 lbf) in relation to other load cells 62 in the load cell array that are not measuring the direct impact of the projectile or threat to the helmet 22.

As shown in FIGS. 4 and 5, for ease of evaluating and testing the helmet 22, the load cell 62 may be configured to be operably coupled to a post 70 such that the load cell 62 is stationary (i.e., not capable of rotating or moving) after being operably coupled to the post 70. The post 70 may be a stationary post that is not configured to rotate but maintains a position in which the post 70 was assembled. The post 70 may have a first end 72 and a second end 74, and the load cell 62 may have a first side 63 and second side 65. In this regard, a first side 63 of the load cell 62 may be operably coupled to the first end 72 of the post 70. The first end 72 of the post 70 may have a bolt 76 affixed thereto. The operably coupling of the first side 63 of the load cell 62 to the first end 72 of the post 70 may be accomplished by sliding the load cell 62 on the bolt 76 such that the bolt 76 extends through the first side 63 of the load cell 62 and out the second side 65 of the load cell 62. It should be understood that while in some example embodiments the load cell 62 may be directly attached to the post 70, other example embodiments may include a mounting plate 75 (see FIG. 7) onto which the load cell 62 or array of load cells 62 are attached (see FIG. 6). The mounting plate 75 may then operably coupled to the post 70 in the manner described above.

The post 70 may also include a channel 78. The channel 78 may extend along a vertical length of the post 70 from the first end 72 to the second end 74. This channel 78 may be configured to receive a cable 66 of the load cell 62. The cable 66 may provide connection between the load cell 62 and a data acquisition system (not shown) which records the force or a power source (not shown) which provides power to the load cell 62. In this regard, the connection of the cable 66 to the load cell 62 may be through a connector 68. The connector 68 may be placed on either the right or left side of the load cell 62 such that the connector 68 and cable 66 do not interfere with the attachment of the load cell 62 to the post 70 and minimize the volume needed for the modular headform assembly 20. Additionally, this placement of the connector 68 enables rotational positioning of the load cell 62 on the post 70 without interference from either the connector 68 or the cable 66. In this regard, the connector 68 may not only be placed on the left or right side of the load cell 62 but may also extend parallel to a diameter of the load cell 62. In other words, the cable 66 may extend along a vertical axis of the post 70 and then be connected to the load cell 62 via the connector 68, where the connector extends off of the left or right side of the load cell 62 at, for example, 90 degrees relative to the vertical axis of the post 70.

In some cases, the post 70 may be operably coupled to a base 90. The base 90 may be configured to stabilize the post 70 in a stationary position. In this regard, the post 70 may be operably coupled to the base at the second end 74 of the post or at end opposite from where the load cell 62 is operably coupled. The post 70 and the base 90 may be metal structures (e.g., stainless steel or the like). In some cases, the post 70 and base 90 may be rigid, metal structures. However, in other example embodiments, the post 70 and the base 90 may be compliant, metal structures or incorporate a spring in order to represent the compliance of a human head when hit by a projectile or threat.

Figure 8:
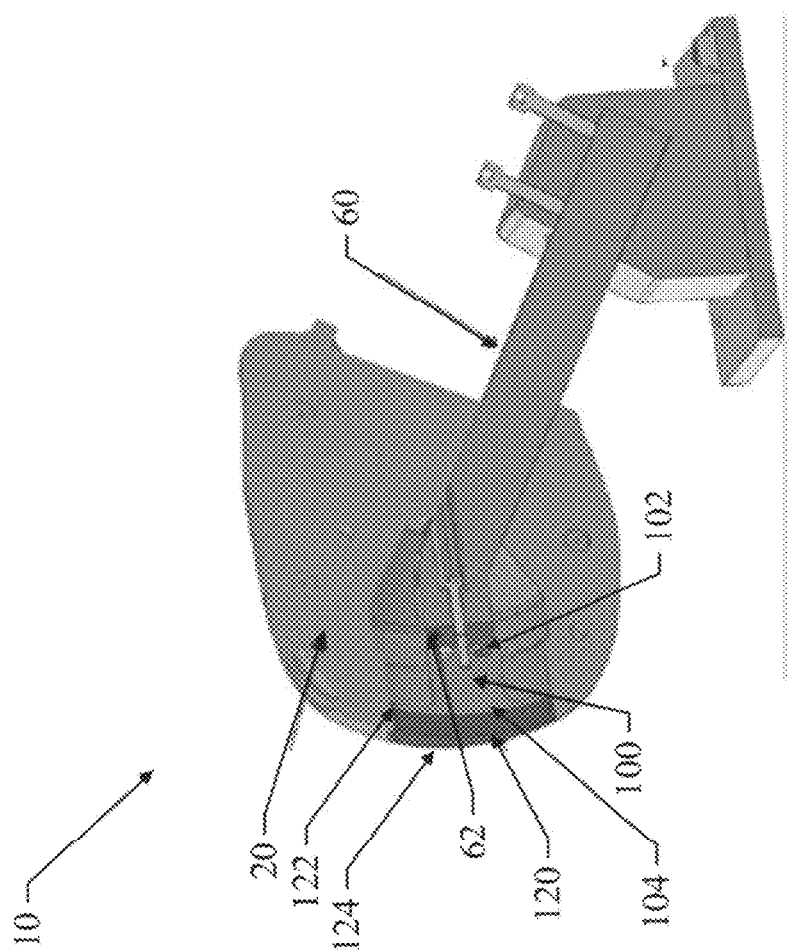
FIG. 8 illustrates a side view of an impact assembly according to a further example embodiment.

FIG. 8 illustrates the impact assembly 60 according to further example embodiments herein. As shown in FIG. 8, the impact assembly 60 may further include an impact cap 100. The impact cap 100 may be configured to absorb the force or load from the impact to the helmet 22. As a result, the impact cap 100, or in some cases a plurality of impact caps 100 as described below, may be configured to cover the maximum damage zone expected from the impact. By covering the maximum damage zone expected, the impact cap 100 ensures that impact forces would be incident on the impact cap 100 itself, rather than the modular headform assembly 20 which may not be configured to be as robust as the impact cap 100. In this regard, to ensure ease of testing of the helmet 22 and that the modular headform assembly 20 is less susceptible to damage from the impact, the impact cap 100 may be sized to fit the maximum damage zone expected to be caused by the projectile or threat. Thus, a diameter of the impact cap 100 may have a predefined diameter. This diameter may be based on the expected damage area for a specific threat or helmet position being tested by the system 10, or the impact cap diameter could be based on a specific area of interest. For example, in some example embodiments, it may be desirable to measure the force of the impact to the helmet 22 over a smaller area to impart insight into how forces from the helmet 22 are localized on the head and what magnitude of stress is incurred at the center of impact. When a smaller area is desired to be measured, a first, smaller diameter impact cap 100 (e.g., about 1.5 inch diameter) may be used to transmit forces over that smaller diameter to the load cell 62. If the loading area is expected to be greater than the area of the smaller diameter impact cap, a second impact cap 100 (e.g., a donut impact cap) surrounding the smaller diameter impact cap, with an inner diameter being approximately the size of the smaller diameter impact cap 100 and an outer diameter approximately the size of the expected damage zone, may be employed to transmit some of the load to either another load cell 62 or to the post 70. However, in cases, where the entire area of impact to the helmet 22 caused by the projectile or threat is desired to be measured, a large diameter impact cap 100 (e.g., about 3.5 inch diameter) may be used. In this regard, an impact cap 100 of some example embodiments contained herein may have a diameter of about 1.0 inch to 4.0 inch. Accordingly, in some embodiments, the single impact cap 100 may have a diameter of at least about 1.0, 1.25, 1.5, 1.75, 2.0, 2.25, or 2.5 inches or at most about 2.75, 3.0, 3.25, 3.5, 3.75, or 4.0 (e.g., about 1.25-4.0 inches, about 1.5-3.5 inches, etc.).

The impact cap 100 may be operably coupled to the load cell 62. In this regard, the impact cap 100 may have a first side 102 and a second side 104. The first side 102 of the impact cap 100 may be operably coupled to the second side 65 of the load cell 62. Because alignment of the impact cap 100 with the load cell 62 ensures proper geometry of the modular headform assembly 20, helmet fit, and accurate standoff between the modular headform assembly 20 and helmet 22 (as discussed below), the operably coupling of the impact cap 100 to the load cell 62 may not rely upon tightening of a threaded screw to dictate position of the impact cap 100 relative to the load cell 62. Rather, the attachment of the impact cap 100 to the load cell 62 may be via magnetic attachment. In this regard, the first side 102 of the impact cap 100 may include a magnet such that the first side 102 of the impact cap 100 may be operably coupled to the second side 65 of the load cell 62. In some example embodiments, the magnet of the impact cap 100 may have a magnetic pull strength of about 8-13 lbf. In this regard, the magnetic pull strength may be at least about 8, 9, or 10 lbf, and at most about 11, 12, or 13 lbf (e.g., about 9-12 lbf, about 10-11 lbf, etc.). The magnetic attachment of the impact cap 100 to the load cell 62 enables not only easy attachment but ensures the impact cap 100 may be rotationally adjusted with respect to the load cell 62, as needed. In some cases, the load cell 62 may have an alignment pin (portion of bolt 76 that extends out the second side 65 of the load cell 62) such that the impact cap may be easily centered and properly aligned on the load cell 62. Furthermore, in some cases, the impact cap 100 may have a mark or notch in an edge of the impact cap 100 to allow for not only easy attachment by the user but also easy rotational alignment which is important to ensure the curvature of the second side 104 of the impact cap 100 is aligned correctly such that when the skin pad 120 is correctly attached, the first side 122 of the skin pad 120 matches the contour of the second side 104 of the impact cap 100 and the second side 124 of the skin pad 120 blends in with the contour of the surrounding headform 200. Accordingly, the attachment mechanism between the load cell 62 and the impact cap 100 enables not only a desired alignment but quick and easy switching of impact caps 100, if necessary.

The impact cap 100 may have curvature configured to conform to the impact location being tested. In particular, the second side 104 of the impact cap 100 may have an outer curvature that is shaped to fit the contours of the position the modular headform assembly 20 is operably coupled to the impact assembly 60. In this respect, each position being tested (see FIG. 3) may require a distinct impact cap 100 that has a distinct curvature that corresponds to the part of the modular headform assembly 20 being tested. Furthermore, the impact cap 100 may be formed of a metal, such as stainless steel or the like, particularly when the impact cap 100 is desired to be used throughout multiple tests of the helmet. However, in other cases, the impact cap 100 may be formed of a frangible composite that is configured to fracture under the same force that would fracture a skull bone. In cases, where the impact cap 100 is designed to mimic a skull bone, the impact cap 100 may need to be replaced between tests. Furthermore, in some example embodiments, the impact cap 100 may have a predefined thickness of about 0.25-1.5 inches. In this regard, the thickness of the impact cap 100 may be at least about 0.25, 0.3, 0.4, 0.5, 0.6, or 0.7 inches, and at most about 0.8, 0.9, 1.0, 1.2, 1.3, 1.4, or 1.5 inches (e.g., about 0.4-0.1.2 inches, about 0.5-1.0 inches, etc.)

In further example embodiments, as shown in FIG. 8, the impact assembly 60 may also include a skin pad 120. The skin pad 120 may be configured to mimic wave propagation through human skin or provide attenuation of the stress wave and protect the load cell 62, and in some cases, the impact cap 100 in response to the impact. In this regard, the skin pad 120 may be configured to dampen the force of the impact and protect the modular headform assembly 20 during extreme impact conditions. In some cases, the skin pad 120 may be formed of viscoelastic materials. These viscoelastic materials may include, for example, any of silicone, natural rubber, ethylene propylene diene, polybutadiene, chloroprene bromo-butyl, styrene butadiene rubber, polynorborene, or combination thereof.

As the skin pad may be configured to mimic wave propagation through human skin or provide attenuation of the stress wave, the skin pad 120 of some example embodiments may have a nominal shore A hardness from about 30-70 and a thickness of 6-20 millimeters (mm). In this regard, the skin pad 120 may have a nominal shore A hardness of at least about 30, 40 or, 50 or at most about 50, 60, or 70 (e.g., about 30-40, about 40-60, etc.), and a thickness of at least about 8, 9, 10, 11, 12, or 13 mm, or at most about 14, 15, 16, 17, 18, 19, or 20 mm (e.g., about 8-12 mm, about 10-14 mm, etc.). Furthermore, as mentioned above, in some cases it may be desirable to measure the force of the impact over a smaller area to give insight into how forces are localized and what magnitude of stress is incurred at the center of impact. In this case, a smaller diameter impact cap 100 may be used during testing. When a smaller impact cap 100 is utilized, with or without a second impact cap 100 (e.g., a donut impact cap), the impact cap 100 may be covered with the skin pad 120 to absorb the forces on the impact cap 100. In one embodiment, the skin pad 120 may also be configured to fill in the gap between the impact cap 100 and the modular headform assembly 20 to protect the modular headform assembly 20 from the impact. Accordingly, it should be understood that the skin pad 120 may have approximately the same diameter of the impact cap 100 when the impact cap 100 is sized to accommodate the expected maximum size of the impact. However, in other cases, the skin pad 120 may have a larger diameter than the impact cap 100 (i.e., a diameter to accommodate the expected maximum size of the impact) in order to protect the modular headform assembly 20 from the impact. In another embodiment, when a smaller impact cap 100 is used, the surrounding gap may instead be filled with a filler ring made of the same material as the impact cap (e.g., metal). The filler ring may not be connected to the impact cap and may not carry any load. However, the filler ring may be robust and have appropriate geometry.

Furthermore, as shown in FIG. 8, the skin pad 120 may have a first side 122 and a second side 124. The first side 122 of the skin pad 120 may be operably coupled to the second side 104 of the impact cap 100, and the second side 124 of the skin pad 120 may be configured to conform to the curvature of the modular headform assembly 20. In this respect, each position being tested (see FIG. 3) may require a distinct skin pad 120 that has a distinct curvature that corresponds to the part of the modular headform assembly 20 being tested. In this regard, as the second side 104 of the impact cap 100 may also be curved to conform to the modular headform assembly 20, both the first side 122 and the second side 124 of the skin pad 120 may have similar curvature.

In even further example embodiments, the impact assembly 60 may also include a pressure indicating film 130 (see FIG. 1). The pressure indicating film 130 may be configured to enable the quantification of the area of damage to the helmet 22 or the modular headform assembly 20. In this regard, the pressure indicating film 130, when used, may be placed over the second side 124 of the skin pad 120 and the modular headform assembly 20. The pressure indicating film 130 may be configured to absorb the impact from the threat in order to quantify the area of the damage. In this regard, a size of the impact from the threat may be evident or imprinted on the pressure indicating film 130.

Figure 9:
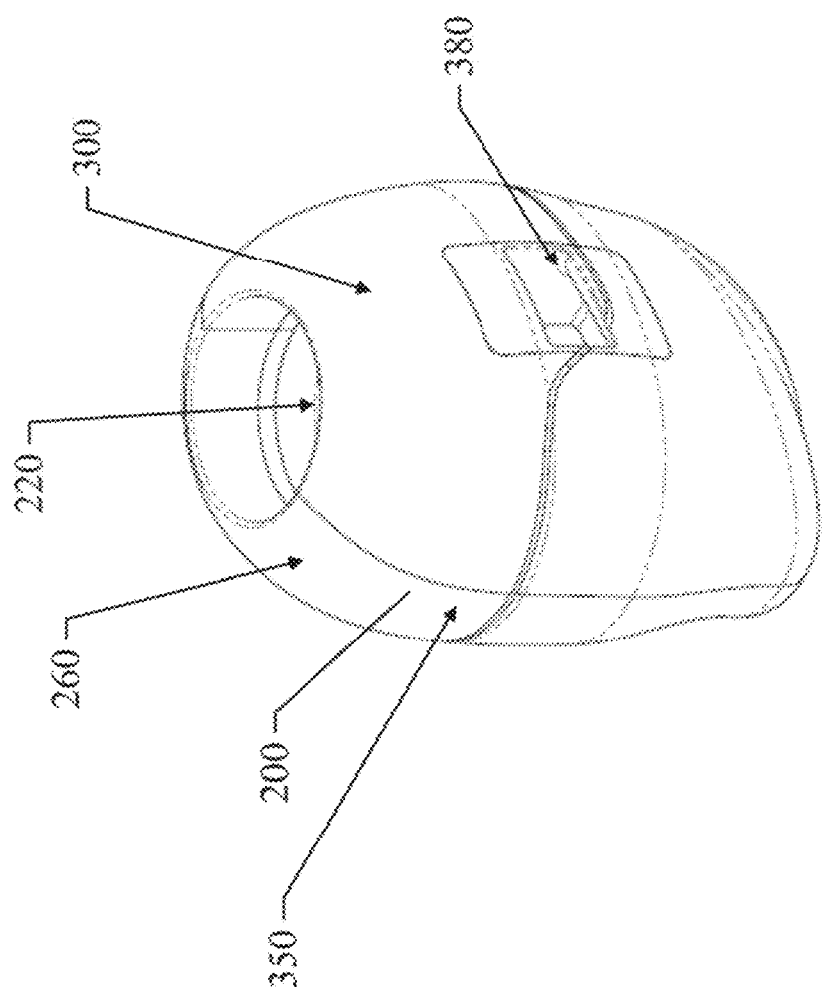
FIG. 9 illustrates a perspective view of a modular headform assembly according to example embodiments herein.
Figure 10:
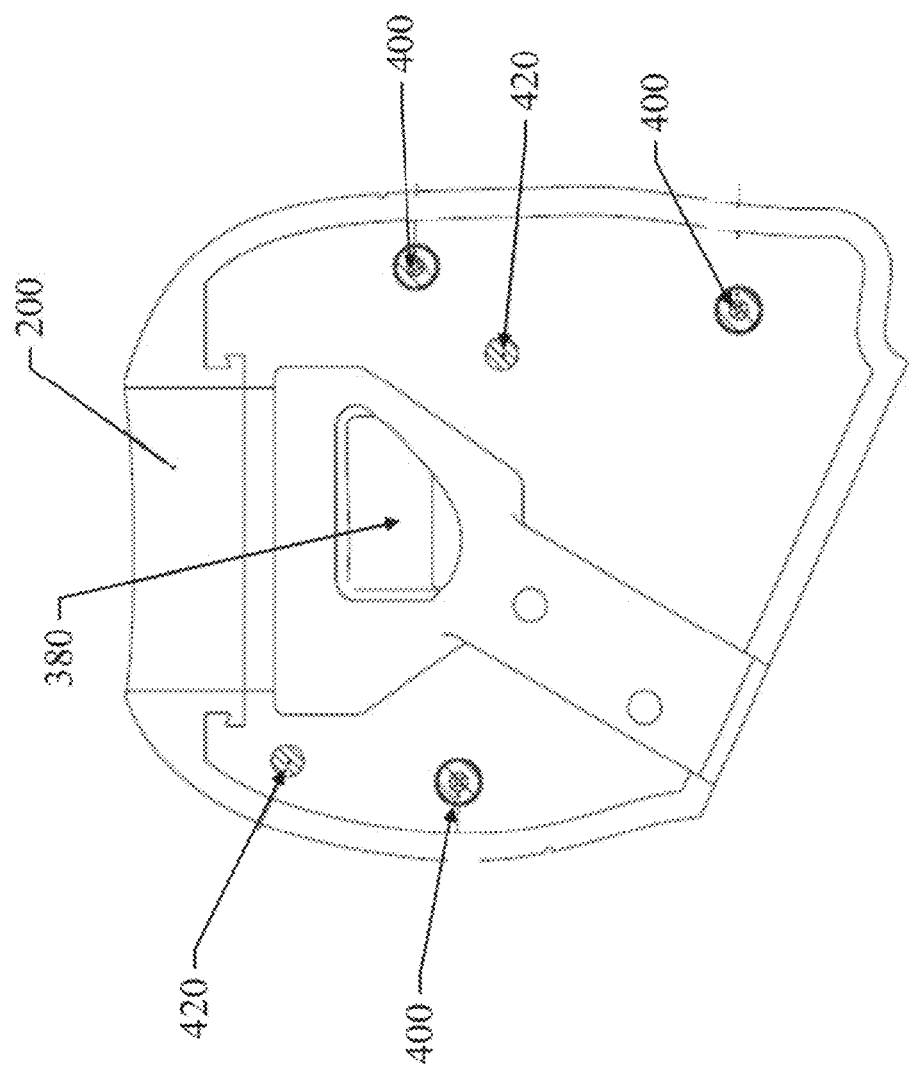
FIG. 10 illustrates a side view of a modular headform assembly according to example embodiments herein.

FIGS. 9 and 10 illustrate the modular headform assembly 20 according to example embodiments herein. The modular headform assembly 20 may include a headform 200 that is configured to mimic an individual's head configuration. As discussed above, the system 10 described herein is configured to evaluate the performance of a helmet 22 and how the performance relates to BHBT with respect to the individual's head wearing the helmet. In this regard, there are four tissues of an individual's head that are of interest with respect to BHBT: 1) scalp; 2) skull: 3) cerebral spinal fluid; and 4) brain. Accordingly, in some example embodiments, each headform 200 may be formed of four separate portions, materials, or components that each separately mimic a respective one of the scalp, skull, cerebral spinal fluid, and the brain. However, in other example embodiments, the headform 200 may be headform that mimics an individual's head generally without any portions, materials, or components that distinguish between the scalp, skull, cerebral spinal fluid, or brain. Of course, some embodiments of the headform 200 may have a material, portion, or component that mimics or matches one of the scalp, skull, cerebral spinal fluid, or brain, and the other components of the headform 200 may mimic the remaining tissues of the human head generally. Regardless of the construction of the headform 200 of the modular headform assembly 20, the headform 200 may be configured to mimic an individual's head such that each test conducted with the system 10 mimics an actual BHBT injury scenario that may occur if the helmet 22 were on an actual human head.

As mentioned above, in some example embodiments, the headform 200 may be formed of multiple components, where each component may each distinctly mimic or match one of the scalp, skull, cerebral spinal fluid, or the brain. In this regard, with respect to the scalp, human skin is viscoelastic in nature due to the presence of high levels of collagen materials.

Accordingly, in some cases, an exterior surface of the headform 200 may be configured to match the viscoelastic nature of that of a human scalp in order to mimic the load transfer of an actual human scalp during the impact. Polymeric materials such as silicone could be used as a scalp surrogate.

With respect to the skull, an actual human skull consists of three layers: two dense surface layers and a porous diploe layer in the middle. While the mechanical properties of a human skull may vary from person to person, a portion of the interior of the headform 200 may be formed of materials or a combination of materials that exhibit the following properties, which are representative properties of an average human skull: 1) a wave speed of about 1200-1450 meter/second (m/s); 2) a modulus of about 2.5-8.5 gigapascal (GPa); 3) a density of about 1.0-1.5 gram per cubic centimeter ($g/cm^3$;) 4) and a maximum tensile strength of about 50-75 megapascal (MPa); and 5) a fracture toughness of about 3-3.5 MPa-m[1]. In this respect, materials that may exhibit these skull properties and may form a portion of the interior of the headform 200 in order to represent the skull may be an epoxy, such as epoxy-FG (35 wt %). With respect to cerebral spinal fluid, the average adult human brain consists of 150 m cerebral spinal fluid with an average thickness of 2-3 mm. Cerebral spinal fluid generally does not contain many large particles and is mostly made of small amount of lipids, electrolytes, tissue enzymes, vitamins, amines, sugar, and a small amount of proteins. Furthermore, cerebral spinal fluid is generally considered to be Newtonian and generally has a shear viscosity of 0.7-1 mPa-s at body temperature. To mimic these properties of cerebral spinal fluid in an interior portion of the headform 200, water, silicone oil, polyethylene glycol (PEG), or a combination thereof may be used in the headform 200 to determine wave propagation and impact behavior on the cerebral spinal fluid.

In regards to the brain, an average human brain (e.g., a human brain having an age ranging from 44 to 92) may be viscoelastic in nature and have a storage modulus and a loss tan $\delta$ of 0.6-1.1 kPa and 0.4-0.55, respectively. To mimic these properties of the brain in an interior portion of the headform 200, a gel or gelation may be used in the headform 200. The gel or gelatin may include an ordnance gelatin or polymer based gels. In this respect, an interior portion of the headform 200 may be formed of a material such as polydimethylsiloxane (e.g., Sylgard 527 or Sylgard 184) in order to represent the brain.

In other example embodiments as discussed above, the headform 200 may not be formed of distinct components that each represent one of the scalp, skull, cerebral spinal fluid, or brain. Rather, the headform 200 may be formed of materials that generally represent the geometry of a human head. In this respect, the headform 200 may be fabricated using a combination of additive manufacturing for an inner structure 220 of the headform 200 and molding of the outer structure 260 of the headform 200. Accordingly, the inner structure 220 may be formed from an acrylonitrile butadiene styrene such as ABS-M30. The inner structure may then be cast in a polyurethane elastomer in order to form the outer structure 260. To ensure adhesion of the outer structure 260 to the inner structure 200 to form an integral headform 200, an adhesion promoter, such as a solvent-based adhesion promotor, may also be used.

Furthermore, each headform 200 may be formed of a first side 300 and a second side 350 that are operably coupled together. The formation of the headform 200 into detachable sides allows for the headform 200 to be disassembled and repositioned in relation to the impact assembly 60 for testing various impact locations or positions. In this regard, the headform 200 may include finger hole 380 in each of the respective sides 300, 350 in order to easily disassemble the sides 300, 350, as needed.

FIG. 10 illustrates a single side of the headform according to example embodiment herein. When operably coupling the first side 300 and the second side 350 of the headform 200 around the load cell 62 in the desired position, the first side 300 and the second side 350 may be operably coupled via magnets 400, alignment pins 420, or a combination thereof. In this regard, each side 300, 350 may include at least one magnet 400 operably coupled to or embedded therein. The magnet 400 is configured to attach the first side 300 to the second 350 for easy assembling and disassembling of the headform 200. Furthermore, at least one alignment pin 420 may disposed in either or both of the first side 300 and second side 350 with a corresponding recess in the other side 300, 350 in order to couple the sides 300, 350 together. Accordingly, in order to operably couple the first side 300 and the second 350 in accordance with an example embodiment, the first side 300 and the second side 350 may be aligned to one another with alignment pins 420 and then attached to one another using magnets 400. In some example embodiments, each of the magnets 400 may have a magnetic pull strength of about 4-9 lbf. In this regard, the magnetic pull strength may be at least about 4, 5, 6 lbf, and at most about 7, 8, or 9 lbf (e.g., about 5-8 lbf, about 6-7 lbf, etc.). Furthermore, to facilitate easy removal and repositioning of the headform between each ballistic event, the modular headform may include finger holes 380 in each side 300, 350. Accordingly, the first side 300 and the second side 350 may be configured to be easily assembled around the post 70 and load cell 62 of the impact assembly 60.

It should be understood that the modular headform assembly 20 may have more than one headform 200. In this respect, one headform 200 may be used to test a first impact location, and then instead of reusing the same headform 200 for testing of further impact locations, additional headforms 200 may be used. In this respect, the first side 300 and the second side 350 may configured to have a geometry that may be customized based on the impact location, projectile being used, or the head or helmet size or geometries of interest.

Furthermore, when testing the performance of the helmet 22, proper standoff between the helmet shell (the area into which helmet makers put padding) and a representative skull is important to maintain in order to have an accurate representation of BHBT. In this regard, tests conducted with approximately 23 mm+0.5 mm standoff between the second side 124 of the skin pad 120 and the interior surface of the helmet 22 ensure accurate measurements. Typically, it would be necessary to adjust a chin strap of the helmet 22 until the required standoff is achieved. However, example embodiments herein provide for a headform 200 that has an adjustable chin in order to easily adjust standoff without adjusting straps of a helmet 22 constantly. In this regard, example embodiments herein may provide for a dial in the headform 200 that could be turned to adjust the position of the chin on the headform 200, which would further reduce adjustment time between tests. In example embodiments, where the chin is adjustable, the chin may be a separate component from the headform 200. In this regard, the chin may be attached to the headform 200 via a threaded mechanism such as a screw, threaded fastener, or the like. Accordingly, the dial may be rotated a predetermined amount in order to adjust the treaded mechanism thereby adjusting the distance between the adjustable chin and the headform 200.

Figure 11:
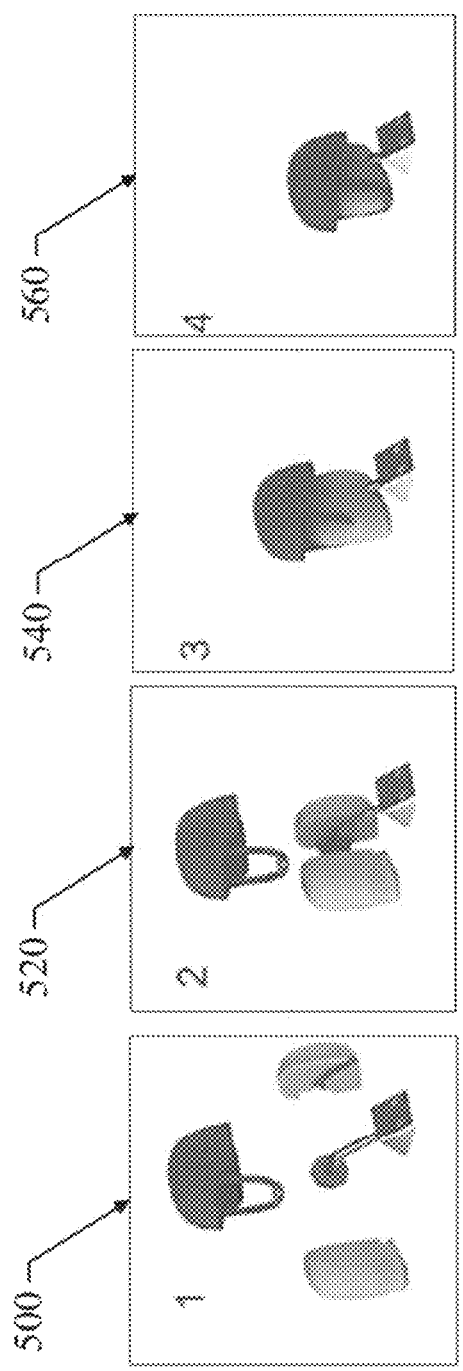
FIG. 11 illustrates a method of evaluating a helmet according to an example embodiment.

FIG. 11 illustrates a method of evaluating or testing the helmet 22 in accordance with example embodiments herein.

In this regard, at operation 500, the impact assembly 60 is assembled. In this regard, the post 70 of the impact assembly 60 may be first inserted into the base 90. The load cell 62 may be operably coupled to the post 70, and the cable 66 of the load cell 62 may be positioned within the channel 78 of the post 70. The impact cap 100 specific to the impact location being tested may then be magnetically attached to the load cell 62, and aligned using the notch on the top of the impact cap 100. The impact cap 100 and the load cell 62 may then be aligned with the incoming projectile or threat. The skin pad 120 may then be aligned using a notch or other marking and then pressed into place over the impact cap 100 and may be held in place by the headform 200. Proper alignment is necessary to ensure that the first side 122 of the skin pad 120 matches the contour of the second side 104 of the impact cap 100 and the second side 124 of the skin pad 120 blends in with the contour of the surrounding headform 200.

As shown at operation 520, the first side 300 and the second side 350 of the headform 200 corresponding to the impact location, helmet size, or helmet geometry being tested may then operably coupled together around the load cell 62 and post 70 by securing each side 300, 350 to one another with magnets 400 while utilizing the alignment pins 420 for proper alignment. At operation 540, the helmet 22 may then secured, and the chin of the headform 200 may be adjusted to ensure proper standoff between the skin pad 120 and the helmet 22. At operation 560, the helmet 22 is read) for testing and evaluation. In this regard, when a threat or projectile is fired at the helmet 22, the load and time is measured by the load cell 62 allowing for not only the measurement of the maximum load but also the measurement of the load magnitude as it changes over the entire duration of the impact event. Once the load and time information is gathered, the headform 200 may be disassembled and the skin pad 120 may be discarded. The load cell may then be checked to ensure the load cell is tightly secured and aligned with the impact cap aligned. The same headform 200 may then be reassembled to test a second helmet or different headform 200 may then be reassembled in order to test a second impact location, helmet size, or helmet geometry as discussed herein. It should be understood that when switching between impact locations, headform sizes, or headform geometries, the impact cap 100, headform 200, and skin pad 120 may need to be replaced in order to ensure appropriate geometry for testing, as described herein. Importantly, the projectile, load cell 62, post 70, and base 90 do not need to be readjusted, which facilitates quick turnaround between testing various impact positions. In this regard, the turnaround time between tests may be less than about 5 minutes.

Figure 12:
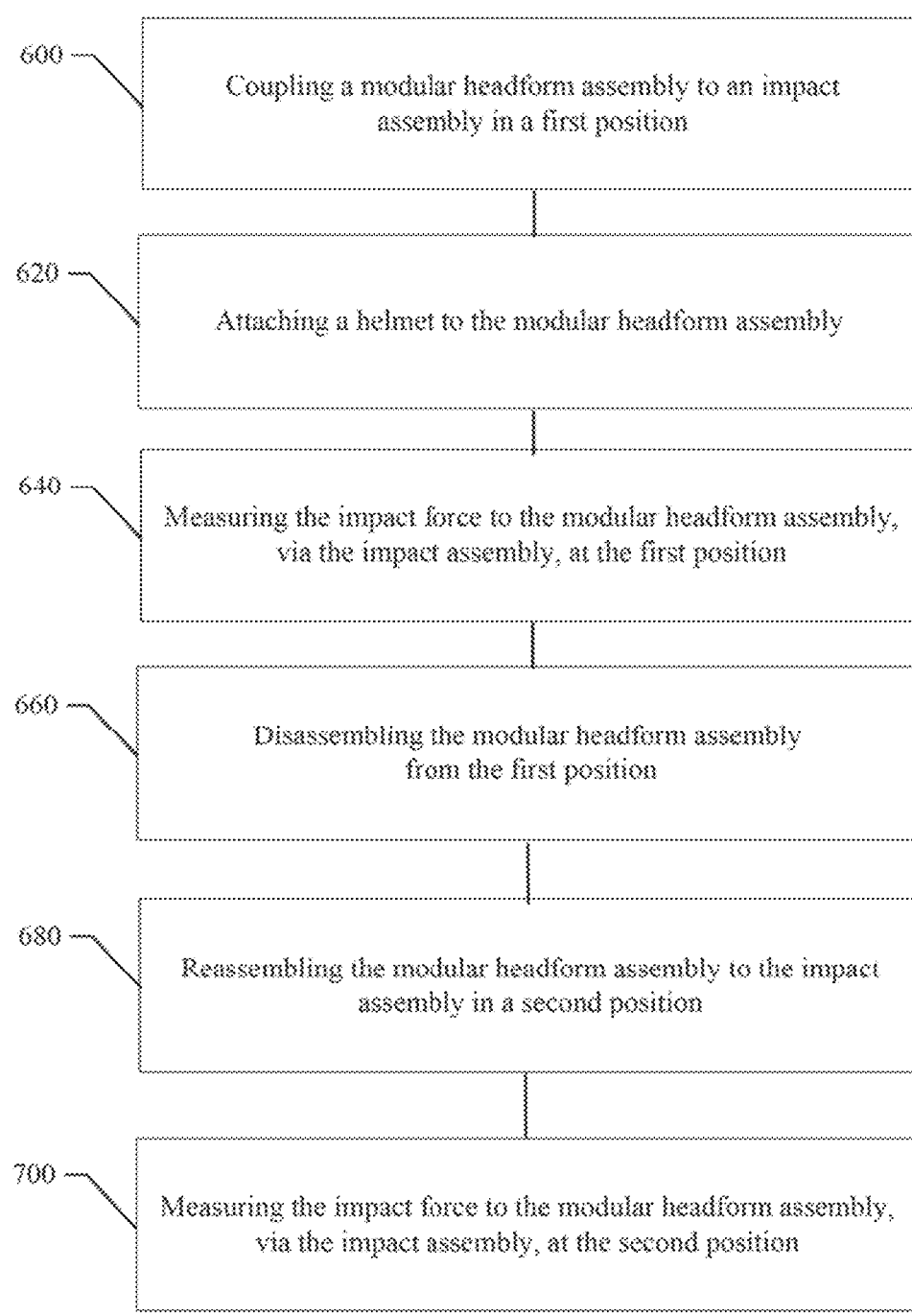
FIG. 12 illustrates a method of evaluating a helmet according to a further example embodiment.

FIG. 12 illustrates a method of evaluating or testing the helmet 22 in accordance with further example embodiments herein. As shown in FIG. 12, the method may include the initial step of coupling a modular headform assembly 20 to an impact assembly 60 in a first configuration. In this regard, the impact assembly 60 may be stationary and configured to measure an impact force to the modular headform assembly 20 at a position where the modular headform assembly 20 is coupled to the impact assembly at operation 600. The method may also include attaching a helmet 22 to the modular headform assembly 20 at operation 620. In this regard, once the helmet 22 is attached to the modular headform assembly 20, a chin of a headform 200 may be adjusted to ensure a proper standoff between the impact assembly 60 and helmet 22 is achieved.

The method may also include measuring the impact force to the modular headform assembly 20, via the impact assembly 60, at the first configuration at operation 640. Then, at operation 660, the method may include dissembling the modular headform assembly 20 from the first configuration. At operation 680, the method may further include reassembling the modular headform assembly 20 to the impact assembly 60 in a second configuration. In this regard, when the modular headform assembly 20 is assembled to the second configuration, the load cell 62 or post 70 do not need to be reconfigured but rather stay stationary and the modular headform assembly 20 is reassembled relative to the stationary load cell 62 and post 70. Furthermore, a source of the projectile or threat that is being fired at the modular headform assembly 20 also stays stationary. Accordingly, the reassembly of the modular headform assembly 20 from the first configuration to the second configuration includes reconfiguring the headform 200 and helmet 22 relative to the stationary load cell 62, post 70, and source of the projectile or threat. At operation 700, the method may include measuring the impact force to the modular headform assembly 20, via the impact assembly 60, at the second position.

Thus, in accordance with example embodiments herein, a system may be provided. The system may include an impact assembly that includes a stationary post operably coupled to one or more stationary load cells and a plurality of modular headforms. Each modular headform may include a first side and a second side configured to lock together around the impact assembly and receive a helmet. The modular headform may determine a position of the helmet relative to the one or more stationary load cells. Furthermore, the one or more stationary load cells may be configured to measure impact force at a position where one of the plurality of the modular headforms are operably coupled to the impact assembly. Additionally, each of the plurality of modular headforms correspond to a position in relation to the impact assembly to measure the impact force to the one or more load cells at a predefined number of impact locations on the helmet to evaluate the performance of the helmet.

In some embodiments, the features described above may be augmented or modified, or additional features may be added. These augmentations, modifications, and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the impact assembly may further include an impact cap configured to absorb the impact force to transmit all of the impact force on a certain area (i.e., the surface area of the impact cap) to the load cell and also to reduce damage to the modular headform as a result of the impact force. Additionally or alternatively, the impact cap may be operably coupled to the one or more stationary load cells by a magnet in the impact cap. Additionally or alternatively, the impact cap may have a predefined diameter to cover a maximum damage zone expected from an impact. Additionally or alternatively, the impact cap may include a first impact cap and a second impact cap surrounding the first impact cap, the first impact cap having a diameter of about 1.5 inches and the second impact cap having an inner diameter substantially a same diameter as the first impact cap and an outer diameter a size of the maximum damage zone expected from the impact. Additionally or alternatively, the impact assembly may further include a skin pad configured to mimic wave propagation through human skin or provide attenuation of the stress wave. Additionally or alternatively, the impact cap may have a first side and a second side, where the first side of the impact cap is operably coupled to the one or more stationary load cells and the second side of the impact cap is operably coupled to the skin pad. Additionally or alternatively, the skin pad may include a viscoelastic material. Additionally or alternatively, the impact cap may have a curvature configured to conform to the modular headform. Additionally or alternatively, each of the plurality of modular headforms may include an adjustable chin to adjust standoff between the impact assembly and the helmet. Additionally or alternatively, the one or more stationary load cells may be an array of load cells, the array of load cells being operably coupled to a mounting plate, and where the mounting plate is operably coupled to the stationary post. Additionally or alternatively, the plurality of modular headforms may each be a different size such that each modular headform is configured to receive a different size helmet. In other words, the plurality of modular headforms may each have a different geometry such that each modular headform is configured to receive a helmet with a different shape. Additionally or alternatively, the first side and the second side of each modular headform may be configured to lock together via magnetic attachment. Additionally or alternatively, the first side and the second side of each modular headform may include an alignment pin to align the first side and the second side when locking the first side and the second together. Additionally or alternatively, the first side and the second side of the modular headform may include an inner structure formed from an acrylonitrile butadiene styrene and an outer structure formed from a polyurethane elastomer.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A system configured to evaluate helmet performance, the system comprising:
   an impact assembly comprising a stationary post operably coupled to one or more stationary load cells; and a plurality of modular headforms, each modular headform comprising a first side and a second side configured to lock together around the impact assembly and receive a helmet, wherein the first side and the second side of each modular headform is configured to lock together via magnetic attachment, wherein the first side and the second side of each modular headform comprises an alignment pin to align the first side and the second side when locking the first side and the second side together, wherein the modular headform determines a position of the helmet relative to the one or more stationary load cells, wherein the one or more stationary load cells are configured to measure impact force at a position where one of the plurality of the modular headforms are operably coupled to the impact assembly, and wherein each of the plurality of modular headforms correspond to a position in relation to the impact assembly to measure the impact force to the one or more load cells at a predefined number of impact locations on the helmet to evaluate the performance of the helmet.

2. The system of claim 1, wherein the impact assembly further comprises an impact cap configured to absorb the impact force.

3. The system of claim 2, wherein the impact cap is operably coupled to the one or more stationary load cells by a magnet in the impact cap.

4. The system of claim 2, wherein the impact cap has a predefined diameter to cover a maximum damage zone expected from an impact.

5. The system of claim 4, wherein the impact cap comprises a first impact cap and a second impact cap surrounding the first impact cap, the first impact cap having a diameter of about 1.5 inches and the second impact cap having an inner diameter substantially a same diameter as the first impact cap and an outer diameter a size of the maximum damage zone expected from the impact.

6. The system of claim 2, wherein the impact assembly further comprises a skin pad configured to mimic wave propagation through human skin or provide attenuation of a stress wave.

7. The system of claim 6, wherein the impact cap has a first side and a second side, wherein the first side of the impact cap is operably coupled to the one or more stationary load cells and the second side of the impact cap is operably coupled to the skin pad.

8. The system of claim 6, wherein the skin pad comprises a viscoelastic material.

9. The system of claim 2, wherein the impact cap has a curvature configured to conform to the modular headform.

10. The system of claim 1, wherein each of the plurality of modular headforms comprises an adjustable chin to adjust standoff between the impact assembly and the helmet.

11. The system of claim 1, where the one or more stationary load cells is an array of load cells, the array of load cells being operably coupled to a mounting plate, and wherein the mounting plate is operably coupled to the stationary post.

12. The system of claim 1, wherein the plurality of modular headforms are each a different size such that each modular headform is configured to receive a different size helmet.

13. The system of claim 1, wherein the first side and the second side of the modular headform comprises an inner structure formed from an acrylonitrile butadiene styrene and an outer structure formed from a polyurethane elastomer.

14. A method for evaluating a helmet, the method comprising:

coupling a modular headform assembly to an impact assembly in a first configuration, wherein the impact assembly is stationary and configured to measure an impact force to the modular headform assembly at a position where the modular headform assembly is coupled to the impact assembly and wherein said coupling comprises:
magnetically attaching a first side and a second side of a headform of the modular headform assembly, and aligning the first side and the second side using an alignment pin;

attaching a helmet to the modular headform assembly;

measuring the impact force to the modular headform assembly, via the impact assembly, at the first configuration;

disassembling the modular headform assembly from the first configuration; reassembling the modular headform assembly to the impact assembly in a second configuration; and measuring the impact force to the modular headform assembly, via the impact assembly, at the second configuration.

15. The method of claim 14, wherein modular headform assembly comprises a first headform and a second headform.

16. The method of claim 15, wherein coupling the modular headform assembly to the impact assembly in the first configuration comprises coupling the first headform to the impact assembly.

17. The method of claim 16, wherein reassembling the modular headform assembly to the impact assembly in the second configuration comprises coupling the second headform to the impact assembly.

18. The method of claim 14, wherein the impact assembly comprises a load cell operably coupled to a stationary post, and wherein coupling the modular headform assembly to the impact assembly in the first configuration position comprises coupling the modular headform assembly around the load cell and the stationary post.

* * * * *